June 12, 1928.  1,673,156
J. R. O'DONNELL ET AL
ORANGE JUICE MILL
Filed Aug. 23, 1926  4 Sheets-Sheet 2
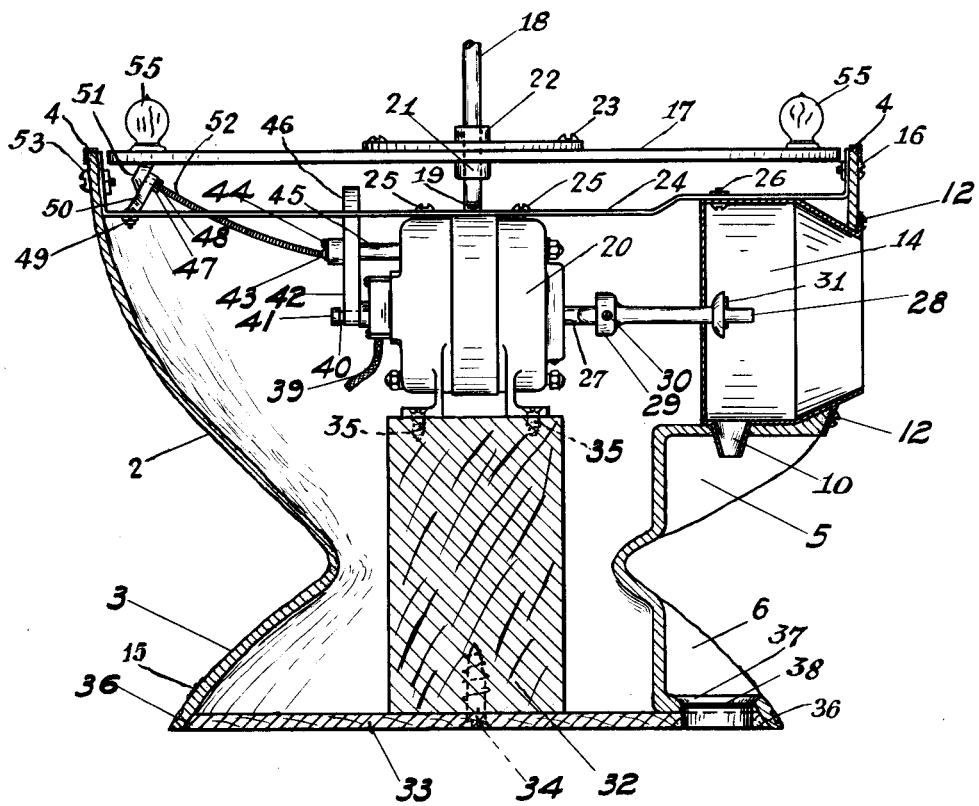
Fig 2
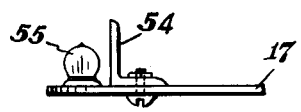
Fig. 2ª
Inventors
John Robert O'Donnell
Fred James Corradini

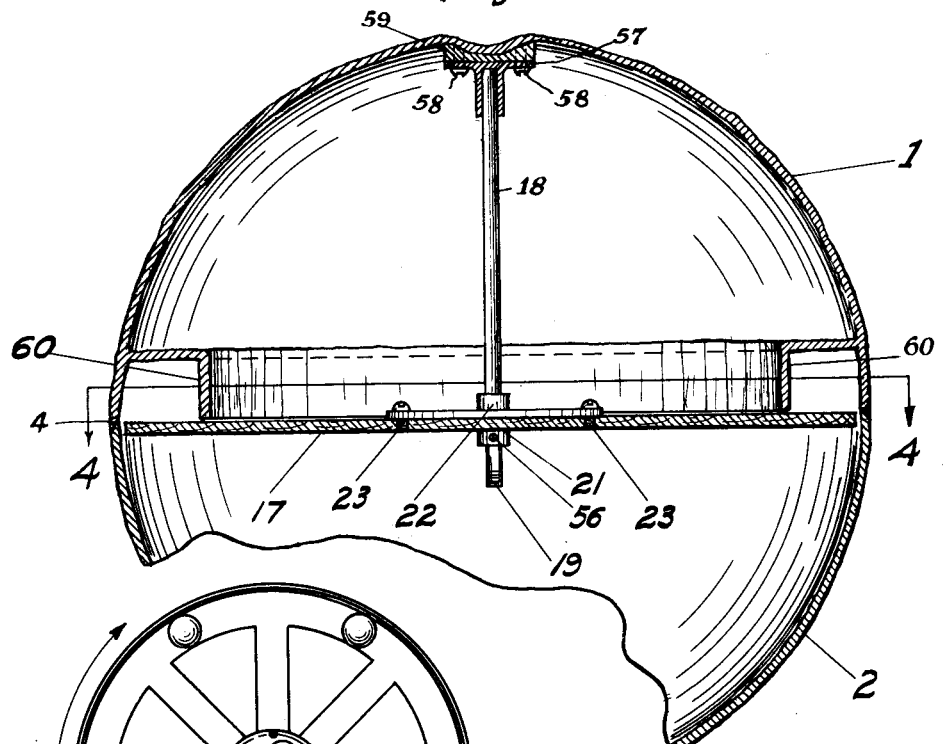

June 12, 1928.

J. R. O'DONNELL ET AL 1,673,156

ORANGE JUICE MILL

Filed Aug. 23, 1926

INVENTORS
John Robert O'Donnell
Fred James Corradini

Patented June 12, 1928.

1,673,156

UNITED STATES PATENT OFFICE.

JOHN ROBERT O'DONNELL AND FRED JAMES CORRADINI, OF LOS ANGELES, CALIFORNIA.

ORANGE-JUICE MILL.

Application filed August 23, 1926. Serial No. 130,980.

This invention relates to improvements in the exhibition of orange juice mills and means for attracting the public and inviting their attention to the sale of the product which the mill is capable of producing.

Devices are now in the market which through their mechanical make up establish a false impression in the individual of what they buy.

It is an established fact that oranges contain food substances which are essential to the diet of man as a nutritive force and for stimulating growth and consequently in view of this belief especially in localities where the growth of oranges abound, numerous orange mills may be found at which places both pure and adulterated orange juice is dispensed. Adulterated orange juice is composed of a small amount of orange juice, sugar, color, citric acid, lemon juice and water and from storage promotes fermentation of the elements derogatory to the nutritious and stimulating effect one so desires.

It is therefore the principal object of this invention to eliminate this mis-conception and to portray and produce a pure orange juice in an orange juice mill which contains no adulteration whatsoever.

To enable a better understanding of the invention reference is made to the accompanying drawings in which—

Fig. 2 is a section through center at right angles to view shown in Fig. 1, showing the lower half only.

Fig. 2ᵃ is a proposed alternate construction of a screen rearward of the window openings.

Fig. 3 is a similar section to that of Fig. 2, showing the upper half as joined to the lower half.

Fig. 4 is a view taken on line 4—4 of Fig. 3.

Fig. 5 is a view of the orange squeezer or juice extractor.

Figure 6:
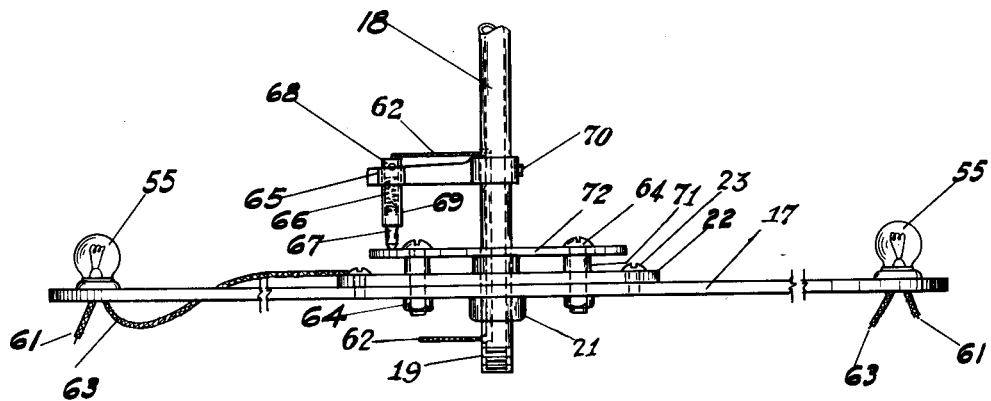

Fig. 6 is a side view fragmentarily showing the electrical operating parts, and

Figure 7:
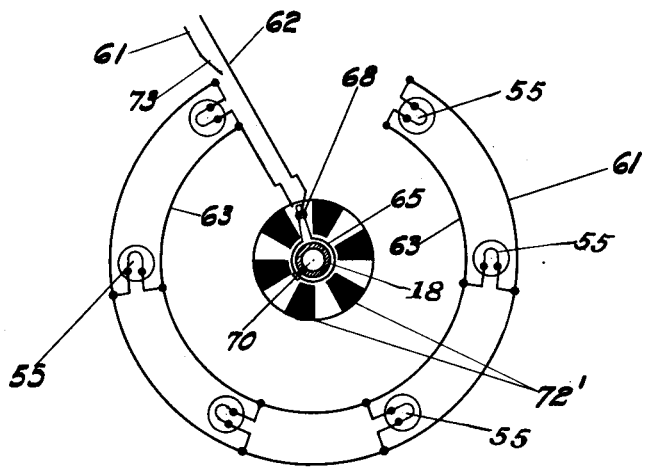

Fig. 7 is a plan wiring diagram illustrative of parts shown in Fig. 6.

Throughout the several figures, similar numerals refer to identical parts.

Figure 1:
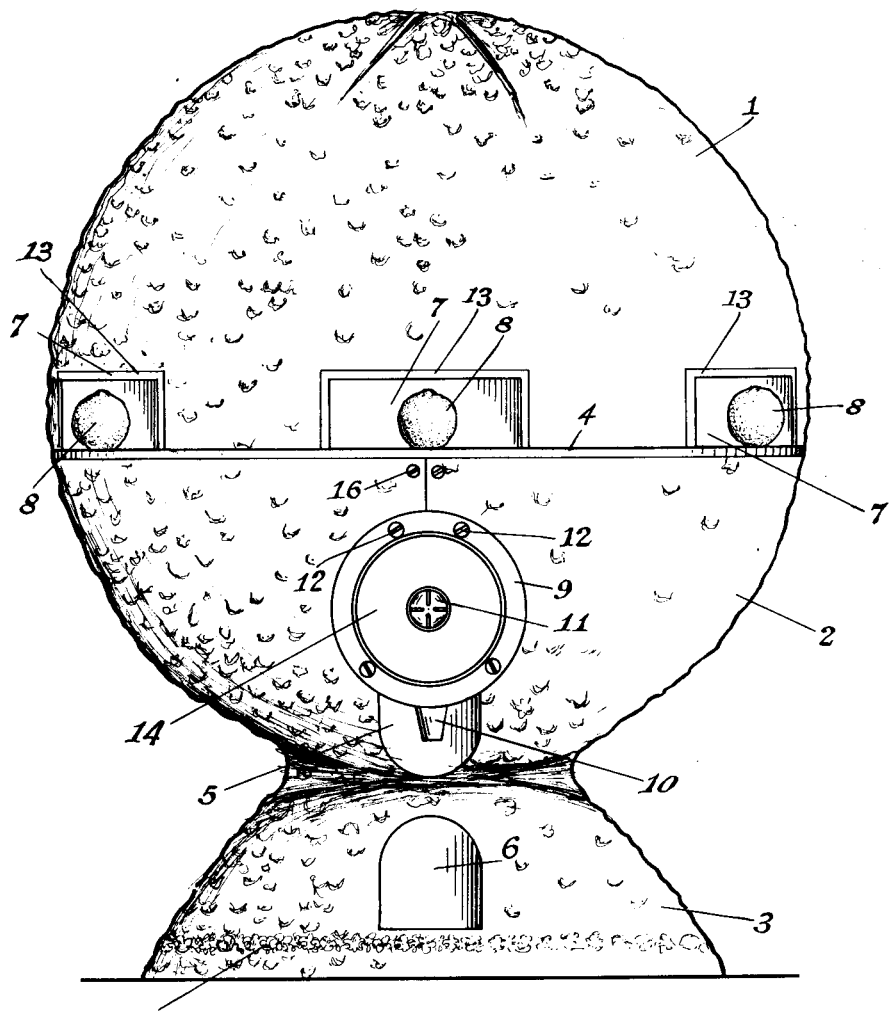
Fig. 1 is a front view of the orange juice mill made to resemble a huge papier mâché orange with a base.

Referring specifically to the drawings, Fig. 1 is a huge papier mâché orange juice mill comprising an upper hemisphere 1 and a lower hemisphere 2 mounted upon a base 3. Into the base is recessed a goblet supporting space 6 to be used in conjunction with a recess 5 in the lower hemisphere 2 to accommodate the upper portion of the goblet. A filigree decorative element 15 encircles the periphery of the base.

The entire device is colored to resemble that of an orange in so far as it is possible to do so.

Into the upper hemisphere near the equatorial boundary of the two hemispheres are recessed a plurality of spaced apertures or display window openings 7, designed to expose a series of oranges or orange colored electric light lamps representing fruit 8, which are mounted at spaced intervals on a rotatative circular disc wheel 17. Around the openings 7 are nickel plated bands 13 and circumscribing the sphere at its equatorial point is a nickel plated band 4. These nickel trimmings taken in conjunction with the orange color of the machine greatly add to its attractiveness.

Centrally apportioned in the lower hemisphere 2 is a juice extracting compartment 14 in which rotates the orange squeezer or juice extractor 11. This compartment 14 contains a spout 10 wherefrom the juice finds egress to a container or goblet and is held in place by a flange 9 through which are screwed fastenings 12 into the papier mâché body.

In the base of the goblet recess 6 is an opening 37 covered with a screen 38 which allows any overflow to pass thru and out of the bottom of the machine.

The base 3 is fastened to a circular wood bottom 33 by nails 36 around the periphery thereof. To the bottom 33 is fastened a wood pedestal 32 by wood screws 34 adapted in supporting an electric motor 20, it being fastened thereby by means of wood screws 35.

The electric motor has a shaft 27 to which is fastened a shaft extension 28 upon which is mounted the orange squeezer 11. Just back of the orange squeezer 11 is a stop 31. The shaft extension 28 is fastened to the motor shaft 27 by a coupling 29 and set screw 30.

A brace 24 consisting of a steel band running across the top of the motor and fastened thereto by screws 25 is flanged and bolted diametrically opposite to the lower hemisphere by bolts 16 and 53.

This brace further supports the orange juice compartment, by being bolted at 26, and the flexible drive 52 fastened by a bracket 50 thereto by bolts 49.

This brace still further aids in establishing rigidity of the device and also eliminates vibration.

Screwed into the motor 20 is a vertical shaft 18 having a threaded portion 19 which acts as an axis upon which the disc wheel 17 rotates. A collar 21 fastened to the shaft 18 by means of set screws 56 (see Fig. 3) forms a support upon which the disc wheel 17 rotates. To this disc wheel 17 is connected a flange bearing 22 by screws 23 also rotative on shaft 18 as an axle. See Fig. 4.

The disc wheel 17 is driven from the electric motor by a bevel friction wheel 51 attached to a flexible drive 52 which is eccentrically fastened to the idler shaft 45 by a clip 43 screwed on to the end of the shaft 45 by screw 44.

The flexible shaft has a supporting brace 50 fastened to brace 24 by a bolt 49. The brace 50 is a spring member and holds the friction wheel 50 against the under side of the disc wheel 17. A collar 47 held by a screw 48 keeps the friction pulley intact with the brace 50.

The motor shaft 27 contains a groove 40. Within this groove and over pulley 46 upon idler shaft 45 runs a belt 42 which rotates the flexible drive 52 and turns disc 17. The boss 41 on the end of the electric motor shaft 27, holds the belt 42 in position.

The shaft 28 upon which the juice extractor 11 rotates has a high R. P. M. and in order to obtain a slow R. P. M. of the disc wheel 17 a satisfactory ratio is obtained by placing pulley 46 on idler shaft 45 and belting it to motor shaft 40 by belt 42.

The vertical shaft 18 also helps to support the upper hemisphere by having a thrust bearing 57 fastened into the top portion thereof by screws 58 through filler 59 into which the shaft 18 is projected.

This construction is not essentially necessary since the upper hemisphere is supported around its equatorial line by the lower hemisphere but is necessary in stabilizing the vertical shaft carrying circular disc wheel 17.

The window display openings 7 may be formed by bending back the papier mâché 60 as shown in Fig. 3 or a triangular shaped piece 54 may be fastened to the disc wheel 17 just in the rear portion of the windows as shown in Fig. 2ª. This method is used to hide any interior parts which might otherwise be exposed to view.

The orange squeezer or juice extractor 11, see Fig. 5, is removable and is easily fixed by inserting it over the end of shaft 28. This permits the orange juice compartment and the orange squeezer to be kept sterile at all times.

Fig. 6 adequately portrays the electrical parts and Fig. 7 illustrates a diagrammatic view of the electrical connections shown in Fig. 6. As mentioned before, the friction pulley 51 rotates the disc 17 about shaft 18 as an axis. A segment plate 72 is mounted upon shaft 18 just over disc 17. In order to rotate this segment plate 72, bolts 64 placed diametrically opposite are fastened to the rotating disc 17. Spacers 71 afford a means in keeping the segmental plate 72 level at all times. The segment plate 72 is insulated at 72' so that the lamps 55 will flash on and off at spaced intervals when entering and leaving the windows 7. Connections to the lamps 55 are to be had through wires 61 and 63 energized from any outside source through lead wire 62 and by closing switch 73. Lead wire 62 runs through the hollow axis of shaft 18 and is connected to brush 67 through insulating cover 69 by spring 66 and cap 68. A projecting arm 65 fastened to the shaft 18 by set screw 70 holds brush 67 in fixed relation to the segmental disc 72. The shaft 18 being insulated from the disc 72 eliminates the possibility of short circuiting.

The electric motor is also operated by an outside source of electrical power through wire 39.

The speed of the rotating disc 17 is very slow, about 6 R. P. M., and the spacing of the windows 7 and the spacing of the electric lamps on the disc 17 are so arranged and timed that there is a constant flashing of the lamps in the windows at all times.

The operation of the device will be understood from the foregoing description and need not be repeated at length at this point.

Various departures from the construction shown and described herein may obviously be made without departing from the invention.

We claim as our invention:

1. In an orange juice mill a papier mâché body spherically formed to resemble a huge orange, said body having a plurality of spaced circumferential openings, near the equatorial line thereof, an electric motor contained in aforesaid body, a vertical shaft supported by said motor, a circular disc wheel carried by said shaft, lamps representing fruit or the like positioned on said circular disc wheel near the periphery thereof and adapted to be energized during the rotation thereof when opposite aforesaid openings; means to rotate said circular disc; an electric circuit in which aforesaid lamps are included, a rotative segment in the circuit and a stationary element having contact with said rotative segment for intermittently opening and closing said electric circuit when said lamps are coincident with said window openings.

2. An orange juice mill including a display apparatus comprising a papier mâché body shaped like an orange, said body being hollow and substantially spherical in form, consisting of an upper and lower half supported by a base, said upper half having a plurality of spaced openings near the equatorial boundary thereof, an electric motor housed in said body, a vertical shaft carried by said motor and supporting aforesaid upper half, a circular disc mounted upon said shaft, glow lamps uniformly spaced near the periphery of said circular disc and opposite to aforesaid openings, means for rotating said disc, an electric circuit containing aforesaid glow lamps, a segment disc in the circuit and conductor means in said circuit whereby to energize said lamps when rotated into said openings.

3. An orange juice mill consisting of a hollow papier mâché body, said body being spherical in shape comprising an upper hemisphere and a lower hemisphere supported by a base, said upper hemisphere having a plurality of spaced openings near the equatorial boundary thereof, a motor in said body, a shaft supported by said motor, a circular disc mounted on said shaft and rotative thereupon, electric lamps mounted on said disc near the periphery thereof, said lamps being adapted to be energized intermittently during the rotation thereof when coincident with said windows.

4. An orange juice mill, comprising a substantially spherical body consisting of an upper hemisphere and a lower hemisphere, said upper hemisphere having a plurality of spaced openings near the equatorial boundary thereof, said lower hemisphere supported by a base, a motor contained in the said body, a vertical shaft supporting aforesaid upper hemisphere supported thereby, a circular disc rotative on said shaft, electric lamps mounted on said circular disc, an electric circuit in which aforesaid electric lamps are included, a segmental disc in aforesaid electric circuit and rotative with aforesaid circular disc, a stationary element having contact with said segmental disc carried by said shaft, means for rotating first said disc thereby rotating said segmental disc whereby said stationary element opens and closes said electric circuit thereby energizing said lamps substantially as set forth.

5. An orange juice mill having a body typifying a huge orange cast hollow with a base, comprising a lower and upper half hemispherically divided, said body having a plurality of display openings uniformly spaced in said upper hemisphere at its juncture with said lower hemisphere, a vertical axis contained in said body, a circular disc wheel disposed to rotate about said vertical axis, glow lamps representing fruit or the like uniformly spaced near the periphery of said circular disc wheel so as to be opposite the display openings in aforesaid upper hemisphere; means for rotating said circular disc wheel; conductors providing an electric circuit in which aforesaid glow lamps are included, a segmental disc included in said circuit and a brush co-operating with said disc and included in said circuit to make and break the same.

6. In combination, a papier mâché body and a motor, a shaft carried by the motor and a circular disc wheel rotative on the shaft, means operative between the motor and said circular disc wheel to rotate said disc wheel; a plurality of lamp bulbs representing fruit or the like carried by said disc wheel, aforesaid body containing openings in the path of said lamps and electrical means for intermittently flashing said lamps in timed relation when appearing opposite to said openings.

7. In an orange juice mill, a body, a motor in the body, a shaft supported by the motor and a circular wheel revolvable upon said shaft as an axis, a plurality of lamp bulbs representing fruit or the like mounted to rotate with said circular disc wheel, said body containing openings in the rotating path of said electric lamps each opening adapted to have appear therein in unison one of said lamp bulbs; means for intermittently energizing each of said lamps that they may register when coincident with said openings and driving means for said rotating circular disc wheel for rotating the same, to cause operation of said energizing of said lamps rotating in said body.

8. In an orange juice mill comprising a papier mâché body spherically formed to have the appearance of a huge orange and a base, of a display apparatus contained in said body, consisting of a circular disc wheel rotatively mounted on a vertically disposed shaft, substantially coincident with the central axis of said body, a plurality of lamps representing fruit or the like mounted near the periphery of said circular disc wheel, aforesaid body containing openings in the path of travel of aforesaid lamps, an electric circuit in which aforesaid electric lamps are included, a rotating make and break switch member included in said circuit, a brush holder formed with a brush receiving opening mounted on aforesaid vertical shaft and adapted to have contact with said make and break member, means of operation through the rotation of said circular disc member for rotating said make and break member, whereby through engagement to said brush to close said circuit thereby intermittently flashing said lamps, when said lamps sweep into movement with said display openings.

9. In an orange juice mill a display in combination with a shell body formed like an orange and having display openings, said display consisting of a plurality of electric lamps representing fruit or the like mounted so as to illuminate within said display openings, cut in aforesaid body and in the path of travel of said lamps, said mounting for the lamps consisting of a circular plate member rotative on a shaft, means to rotate said plate member about said shaft as an axis at an angular velocity bearing a fixed ratio so as to intermittently illuminate said lamps when adjacent to said display openings.

10. In a papier mâché orange juice mill having display openings orbicularly formed therein comprising a hollow globular body simulating that of an orange mounted on a base, wherein juice is extracted from the orange, of a display for advertising the sale of said juice, said display consisting of a plurality of electric lamps representing fruit or the like adapted to rotate in a path whose orbit is that of aforesaid display openings and means to rotate said lamps in said orbit.

11. An orange juice mill comprising a huge papier mâché body simulating that of an orange with a base of an orange juice dispensing means and a goblet receiving receptacle formed in the shell body of said mill, in combination with a display advertising means including niches orbicularly formed in the surface of said body and a plurality of electric lamps representing fruit or the like mounted within said body and adapted to rotate in a path whose orbit is that of said niches, means for rotating said lamps in said orbit and means for energizing said lamps when passing within said niches.

12. In combination an orange juice mill and a display therefor, said mill comprising a papier mâché body simulating that of an orange carried by a base having an orange juice dispensing means and a support for a container therefor, said mill containing openings orbicularly formed therein, a plurality of electric lamps adapted to rotate in the path of said openings, means to rotate said lamps in said openings, an electric circuit in which said lamps are included and means for synchronously illuminating said lamps when coincident with said openings.

13. In combination with an orange juice extracting means and a display comprising a globular body simulating that of an orange supported by a base with said juice extracting means contained therein, said body containing display openings orbicularly positioned in the surface of said body, a rotating disc having mounted thereupon a plurality of energizable electric lamp bulbs, representing fruit or the like which traverse a path whose orbit is that of said display openings, means to rotate said disc and means to energize said lamps when coincident with said openings and de-energize them when obscured from said openings.

14. A display in combination with an orange juice dispensing machine, said display advertising the kind of juice dispensed comprising a spherically formed body with a base having a plurality of orbicularly formed display openings contained in the surface thereof and imitation fruit simulating that of the juice dispensed from said machine mounted so as to rotate orbital in relation to said display openings and means for rotating said fruit in said display openings.

15. A papier mâché orange juice mill comprising a hollow globular body simulating that of an orange mounted on a base, said body having a plurality of circumferential openings orbicularly formed in the shell of said body, a rotative disc and imitation oranges fixedly mounted thereupon to rotate in the path of said openings and means to rotate said imitation oranges in said path.

16. An orange juice mill comprising a spherical papier mâché body with a base, said body having a plurality of circumferential display openings orbicularly formed in said body, a rotative disc having a perpendicular axis of support mounted within said shell and in a plane with said openings, imitation oranges mounted on said disc, said imitation oranges being adapted to be rotated in a plane with said display openings so as to be viewed when coincident with said openings and means for rotating aforesaid disc.

17. In combination in an orange mill, a fruit juice extracting means and a display therefor, comprising a huge papier mâché body simulating that of an orange supported by a base, a cavity in said body wherein to project said juice extracting means, a goblet receiving receptacle formed in the shell body of said mill, an opening in said cavity wherefrom to discharge the juice, a plurality of circumferential display openings formed in said body, a plurality of energizable imitation oranges mounted interiorly in said body and adapted to rotate consecutively into and out of view in said openings, means to rotate said imitation oranges, means to energize said imitation oranges when coincident with said openings and de-energize them when obscured from said openings.

In testimony whereof, we have hereunto set our hands at Los Angeles, California, this 16th day of August, 1926.

JOHN ROBERT O'DONNELL.
FRED JAMES CORRADINI.